United States Patent [19]

Adams, III et al.

[11] Patent Number: 4,523,273
[45] Date of Patent: Jun. 11, 1985

[54] EXTRA STAGE CUBE

[75] Inventors: George B. Adams, III; Howard J. Siegel, both of West Lafayette, Ind.

[73] Assignee: Purdue Research Foundation, Lafayette, Ind.

[21] Appl. No.: 452,438

[22] Filed: Dec. 23, 1982

[51] Int. Cl.³ .............................................. G06F 1/00
[52] U.S. Cl. .................................................. 364/200
[58] Field of Search ........................... 382/28, 41, 49; 364/200 MS File, 900 MS File

[56] References Cited

U.S. PATENT DOCUMENTS

| | | | |
|---|---|---|---|
| 3,794,983 | 2/1974 | Sahin | 382/28 |
| 4,011,545 | 3/1977 | Nadir | 364/200 |
| 4,060,795 | 11/1977 | Harumiya et al. | 364/900 |
| 4,090,174 | 5/1978 | Van Voorhis | 364/900 |
| 4,247,892 | 1/1981 | Lawrence | 364/200 |
| 4,301,443 | 11/1981 | Sternberg et al. | 382/49 |
| 4,414,685 | 11/1983 | Sternberg | 382/49 |

Primary Examiner—Harvey E. Springborn
Attorney, Agent, or Firm—Barnes & Thornburg

[57] ABSTRACT

A multistage data routing system for routing a plurality of data streams comprises a cube comprising a plurality of stages sequentially numbered n−1 through 0 and an extra stage n situated to proceed n−1 of the cube. Stages n through 0 comprise a plurality of data switching boxes. Each box includes a first input port, a second input port, a first output port, a second output port, and apparatus for selectively coupling the first input port to at least one of the output ports and the second input port to at least one of the output ports. Extra stage n and stage 0 include apparatus for selectively bypassing stage n or stage 0 or neither stage n nor stage 0. The system further comprises a plurality of links, each coupling a selected ouput port of a selected stage to a selected input port of the next adjacent downstream stage. The system also comprises a system control unit which couples a selected input port of a data switching box of stage n to at least one of the ouput ports of the data switching boxes of stage 0 and selectively simultaneously disables the selective bypassing apparatus of at least one of stage n and stage 0.

14 Claims, 11 Drawing Figures

STAGE 2   1   0

STRAIGHT

EXCHANGE

LOWER BROADCAST

UPPER BROADCAST

STAGE 3   2   1   0

STAGE   3   2   1   0

CUBE FUNCTION
IMPLEMENTED: 2   1   0   2

STAGE   3   2   1   0

CUBE FUNCTION
IMPLEMENTED: 0   1   2   0

EXTRA STAGE CUBE

The work which resulted in this invention was supported by U.S. Air Force Office of Scientific Research, Air Force Systems Command, under Grant AFOSR-78-3581 and the National Science Foundation under Grant ECS 80-16580. The Government has certain rights in this invention.

The demand for very high-speed processing coupled with falling hardware costs has made large-scale parallel and distributed supercomputer systems both desirable and feasible. An important component of such supersystems is a mechanism for information transfer among the computation nodes and memories. Because of system complexity, assuring high reliability is a significant task. Thus, a crucial practical aspect of an interconnection network used to meet system communication needs is fault tolerance.

Multistage cube-type networks such as the baseline (see, C. Wu and T. Feng, "On a class of multistage interconnection networks," IEEE Trans. Comput., vol. C-29, pp. 694-702, August 1980), delta (see J. H. Patel, "Performance of processor-memory interconnections for multiprocessors," IEEE Trans. Comput., vol. C-30, pp. 771-780, October 1981), Generalized Cube (see H. J. Siegel and S. D. Smith, "Study of multistage SIMD interconnection networks," in Proc. 5th Symp. Comput. Architecture, April 1978, pp. 223-229), indirect binary n-cube (see M. C. Pease, III, "The indirect binary n-cube microprocessor array," IEEE Trans Comput., vol. C-26, pp. 458-473, May 1977), omega (see D. H. Lawrie, "Access and alignment of data in an array processor," IEEE Trans. Comput., vol. C-24, pp. 1145-1155, December 1975), shuffle-exchange (see S. Thanawastien and V. P. Nelson, "Interference analysis of shuffle/exchange networks," IEEE Trans. Comput., vol. C-30, pp. 545-556, August 1981), STARAN flip (see K. E. Batcher, "The flip network in STARAN," in Proc. 1976 Int. Conf. Parallel Processing, August 1976, pp. 65-71), and SW-banyan (S=F=2) (see L. R. Goke and G. J. Lipovski, "Banyan networks for partitioning multimicroprocessor systems," in Proc. 1st Symp. Comput. Architecture, December 1973, pp. 21-28) have been proposed for use in parallel/distributed systems. The Generalized Cube is representative of these networks in that they are topologically equivalent to it (see H. J. Siegel, "Interconnection networks for SIMD machines," Computer, vol. 12, pp. 57-65, June 1979; Siegel and Smith, supra; and Wu and Feng, supra). The problem with this topology is that there is only one path from a given network input to a given output. Thus, if there is a fault on that path, no communication is possible.

According to this invention, the Extra Stage Cube (ESC), a fault-tolerant network, is derived from the Generalized Cube. The ESC is capable of operating in both SIMD and MIMD (see M. J. Flynn, "Very high-speed computing systems," Proc. IEEE, vol. 54, pp. 1901-1909, December 1966) environments. The ESC comprises a Generalized Cube with an additional stage at the input and hardware to permit the bypass, when desired, of the extra stage or the output stage. Thus, the ESC has a relatively low incremental cost over the Generalized Cube (and its equivalent networks). The extra stage provides an additional path from each source to each destination. The known useful attributes of partitionability (see H. J. Siegel, "The theory underlying the partitioning of permutation networks," IEEE Trans. Comput., vol. C-29, pp. 791-801, September 1980) and distributed control through the use of routing tags (see Lawrie, supra) are available in the ESC. Therefore, the ESC is a practical answer to the need for reliable communications in parallel/distributed supersystems.

Multistage cube-type networks have been proposed for many supersystems. These include PASM (see H. J. Siegel, L. J. Siegel, F. C. Kemmerer, P. T. Mueller, Jr., H. E. Smalley, Jr., and S. D. Smith, "PASM: A partitionable SIMD/MIMD system for image processing and pattern recognition," IEEE Trans. Comput., vol. C-30, pp. 934-947, December 1981), PUMPS (see F. A. Briggs, K. Hwang, K. S. Fu, and M. C. Dubois, "PUMPS architecture for pattern analysis and image database management," in Proc. Pattern Recognition Image Processing Conf., August 1981, pp. 387-398), the Ballistic Missile Defense Agency distributed processing test bed (see W. C. McDonald and J. M. Williams, "The advanced data processing testbed," in Proc. COMPSAC, March 1978, pp. 346-351; and H. J. Siegel and R. J. McMillen, "The multistage cube: A versatile interconnection network," Computer, vol. 14, pp. 65-76, December 1981), Ultracomputer (see A. Gottlieb, R. Grishman, C. P. Kruskal, K. P. McAuliffe, L. Rudolph, and M. Snir, The NYU ultracomputer—a general-purpose parallel processor, Ultracomput. Note 32, Rep. 034, July 1981, 33 pp), the Flow Model Processor of the Numerical Aerodynamic Simulator (see G. H. Barnes, "Design and validation of a connection network for many-processor multiprocessor systems," in Proc. 1980 Int. Conf. Parallel Processing, August 1980, pp. 79-80), and data flow machines (see J. B. Dennis, G. A. Boughton, and C. K. C. Leung, "Building blocks for data flow prototypes," in Proc. 7th Symp. Comput. Architecture, May 1980, pp. 1-8). The ESC can be used in any of these systems to provide fault tolerance in addition to the usual cube-type network communication capability.

The ESC can be used in various ways in different computer systems. The ESC can be incorporated in the PASM and PUMPS supersystems. PASM, a partitionable SIMD/MIMD machine being designed at Purdue University (see Siegel, Siegel, Kemmerer et al, supra), is a dynamically reconfigurable multimicroprocessor system using up to 1024 processing elements (processor/memory pairs), or PE's, to do image processing and pattern recognition tasks. In this context, the network would operate in a unidirectional, PE-to-PE packet switched mode (see Siegel and McMillen, supra). The PUMPS MIMD architecture (see Briggs, supra), also under development at Purdue, consists of multiple processors with local memories which share special purpose peripheral processors, VLSI functional units, and a common main memory. The network serves in a bidirectional, circuit switched environment for this architecture, connecting local memories to the common main memory.

The invention may best be understood by reference to the following detailed description and accompanying drawings which illustrate the invention. In the drawings.

DEFINITION OF THE ESC AND ITS RELATION TO THE GENERALIZED CUBE

An SIMD (single instruction stream—multiple data stream) (see Flynn, supra) machine typically includes a control unit, a number of processors, an equal number of memory modules, and an interconnection network. The control unit broadcasts instructions to all of the processors, and all active processors execute the same instruction at the same time. Thus, there is a single instruction stream. Each active processor executes the instruction on data in its own associated memory module. Thus, there are multiple data streams. The interconnection network, sometimes referred to as an alignment or permutation network, provides a communications facility for the processors and memory modules (see H. J. Siegel, "A model of SIMD machines and a comparison of various interconnection networks," IEEE Trans. Comput., vol. C-28, pp. 907–917, December 1979). The Massively Parallel Processor (MPP) (see K. E. Batcher, "Design of a massively parallel processor," IEEE Trans. Comput., vol. C-29, pp. 836–840, September 1980) is an example of an SIMD supersystem.

An MIMD (multiple instruction stream—multiple data stream) machine (see Flynn, supra) typically comprises a number of processors and an equal number of memories, where each processor can follow an independent instruction stream. As with SIMD architectures, there are multiple data streams and an interconnection network. Thus, there are a number of independent processors which can communicate among themselves. There may be a coordinator unit to help orchestrate the activities of the processors. Cm* (see R. J. Swan, S. H. Fuller, and D. P. Siewiorek, "Cm*: A modular multimicroprocessor," in AFIPS 1977 Nat. Comput. Conf., June 1977, pp. 637–644) is an example of an MIMD supersystem.

An MSIMD (multiple-SIMD) machine is a parallel processing system which can be structured as one or more independent SIMD machines, e.g., MAP (see G. J. Nutt, "Microprocessor implementation of a parallel processor," in Proc. 4th Symp. Comput. Architecture, March 1977, pp. 147–152). A partitionable SIMD/MIMD machine is a system which can be configured as one or more independent SIMD and/or MIMD machines, e.g., the DCA (see S. I. Kartashev and S. P. Kartashev, "A multicomputer system with dynamic architecture," IEEE Trans. Comput. vol. C-28, pp. 704–720, October 1979) and TRAC (see U. V. Premkumar, R. Kapur, M. Malek, G. J. Lipovski, and P. Horne, "Design and implementation of the banyan interconnection network in TRAC," in Proc. AFIPS 1980 Nat. Comput. Conf., June 1980, pp. 643–653) supersystems.

Figure 1:
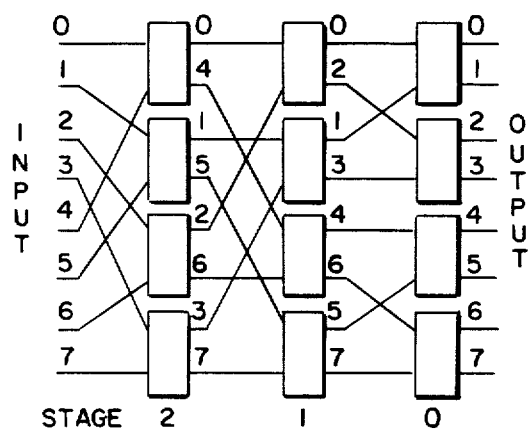
FIG. 1 is a block diagram of the so-called Generalized n stage Cube with $n=3$, $2^n=N=8$ (0–7) inputs and includes simplified block diagrams of the four states of an interchange box.
Figure 1:
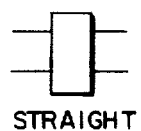
Figure 1:
Figure 1:
Figure 1:

The Extra Stage Cube (ESC) network is useful in large-scale SIMD, MIMD, MSIMD, and partitionable SIMD/MIMD supersystems. It can be defined by first considering the Generalized Cube network from which it is derived. The Generalized Cube network is a multistage cube-type network topology which was presented in Siegel and Smith, supra. This network has N input ports and N output ports, where $N=2^n$. It is shown in FIG. 1 for N=8. The network ports are numbered from 0 to N−1. Input and output ports are network interfaces to external devices called sources and destinations, respectively, which have addresses corresponding to their port numbers. The Generalized Cube topology has $n=\log_2 N$ stages, where each stage includes a set of N lines connected to N/2 interchange boxes. Each interchange box is a two-input, two-output device and is individually controlled. An interchange box can be set to one to four legitimate states. Let the upper input and output lines be labeled i and the lower input and output lines be labeled j. The four legitimate states are: (1) straight—input i to output i, input j to output j; (2) exchange—input i to output j, input j to output i; (3) lower broadcast—input j to outputs i and j; and (4) upper broadcast—input i to outputs i and j (see Lawrie, supra). This is shown in FIG. 1.

The interconnection network can be described as a set of interconnection functions, where each is a permutation (bijection) on the set of interchange box input/output line labels (see H. J. Siegel, "Analysis techniques for SIMD machine interconnection networks and the effects of processor address masks," IEEE Trans. Comput., vol. C-26, pp. 153–161, February 1977). When interconnection function f is applied, input S is connected to output f(S)=D for all S, $0 \leq S < N$, simultaneously. That is, saying that the interconnection function maps the source address S to the destination address D is equivalent to saying the interconnection function causes data sent on the input port with address S to be routed to the output port with address D. SIMD systems typically route data simultaneously from each network input via a sequence of interconnection functions to each output. For MIMD systems, communication from one source is typically independent of other sources. In this situation, the interconnection function is viewed as being applied to the single source, rather than all sources.

The connections in the Generalized Cube are based on the cube interconnection functions (see Siegel, supra). Let $P = p_{n-1} \ldots p_1 p_0$ be the binary representation of an arbitrary I/O line label. Then the n cube interconnection functions can be defined as:

$$cube_i(p_{n-1} \ldots p_1 p_0) = p_{n-1} \ldots p_{i+1} \bar{p_i} p_{i-1} \ldots p_1 p_0$$

where $0 \leq i < n$, $0 \leq P < N$, and $\bar{p}_i$ denotes the complement of $p_i$. This means that the cube interconnection function connects P to cube$_i$(P), where cube$_i$(P) is the I/O line whose label differs from P in just the ith bit position. Stage i of the Generalized Cube topology contains the cube$_i$ interconnection function, i.e., it pairs I/O lines whose addresses differ in the ith bit position. It is the only stage which can map a source to a distination with an address different from the source in the ith bit position.

A link is any line connecting two network interchange boxes. Note that neither a network input port nor output port is considered a link. A link has the same label as the box output and input it joins. A path is a set of interchange box settings and links which forms a connection between a given source and its destination. A broadcast path is a set of paths which route a source to two or more destinations (using the lower and/or upper broadcast settings of the interchange boxes as needed).

Figure 2:
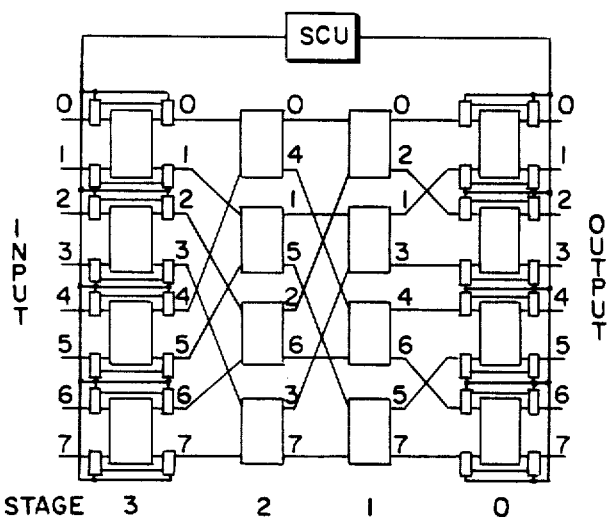
FIG. 2 is a block diagram of an Extra Stage Cube (ESC) network constructed according to the invention with N=8.

The ESC is formed from the Generalized Cube by adding an extra stage along with a number of multiplexers and demultiplexers. Its structure is illustrated in FIG. 2 for N=8. The extra stage, stage n, is placed on the input side of the network and implements the cube$_0$ interconnection function. Thus, there are two stages in the ESC which can perform cube$_0$.

Figure 3A:
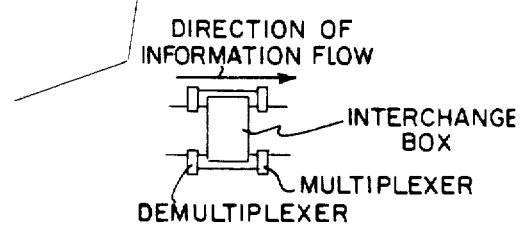
FIG. 3a is a detail of an interchange box constructed according to the present invention with a multiplexer and a demultiplexer for enabling and disabling.
Figure 3B:
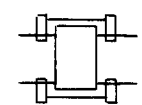
FIG. 3b is an interchange box constructed according to the present invention enabled.
Figure 3C:
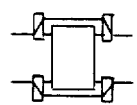
FIG. 3c is an interchange box constructed according to the present invention disabled.

Stage n and stage 0 can each be enabled or disabled (bypassed). A stage is enabled when its interchange boxes are being used to provide interconnection. It is disabled when its interchange boxes are being bypassed. Enabling and disabling in stages n and 0 is accomplished with a demultiplexer at each box input and a multiplexer at each output. FIG. 3 details an interchange box from stage n or 0. Each demultiplexer has two outputs. One demultiplexer output goes to a box input, the other to an input of its corresponding multiplexer, which also has two inputs. The remaining multiplexer input is from the matching box output. The demultiplexer and multiplexer are configured such that they either both connect to their box (i.e., enable the box output) or both shunt it (i.e., disable the box output). All demultiplexers and multiplexers for stage n share a common control signal, as do those for stage 0. The control signal is provided by a system control unit (SCU) illustrated in FIG. 2 but deleted from FIGS. 3a, 3b, 3c, 4, 5, and 7 for purposes of clarity.

Stage enabling and disabling is performed by a system control unit. Normally, the network will be set so that stage n is disabled and stage 0 is enabled. The resulting structure is that of the Generalized Cube. If after running fault detection and location tests a fault is found, the network is reconfigured. If the fault is in stage 0 then stage n is enabled and stage 0 is disabled. For a fault in a link or box in stages n−1 to 1, both stages n and 0 will be enabled. A fault in stage n requires no change in network configuration; stage n remains disabled. If a fault occurs in stages n−1 through 1, in addition to reconfiguring the network the system informs each source device of the fault by sending it a fault identifier.

For both the Generalized Cube and the ESC, stage i, $0 < i < n$, determines the ith bit of the address of the output port to which the data are sent. Consider the route from source $S = s_{n-1} \ldots s_1 s_0$ to destination $D = d_{n-1} \ldots d_1 d_0$. If the route passes through stage i using the straight connection, then the ith bit of the source and destination addresses will be the same, i.e., $d_i = s_i$. If the exchange setting is used, the ith bits will be complementary, i.e., $d_i = \bar{s}_i$. In the Generalized Cube, stage 0 determines the 0th bit position of the destination in a similar fashion. In the ESC, however, both stage n and stage 0 can affect the 0th bit of the output address. Using the straight connection in stage n performs routings as they occur in the Generalized Cube. The exchange setting makes available an alternate route not present in the Generalized Cube. In particular, the route enters stage n−1 at label $s_{n-1} \ldots s_1 \bar{s}_0$, instead of $s_{n-1} \ldots s_1 s_0$.

FAULT TOLERANCE OF THE EXTRA STAGE CUBE

Introduction

In the fault model used in this discussion to explain the fault tolerance capabilities of the ESC, failures may occur in network interchange boxes and links. However, the input and output ports and the multiplexers and demultiplexers directly connected to the ports of the ESC are always assumed to be functional. If a port of the stage n demultiplexers or stage 0 multiplexers were to be faulty, then the associated device would have no access to the network. Such a circumstance will not be considered in this description.

Once a fault has been detected and located in the ESC, the failing portion of the network is considered unusable until such time as the fault is remedied. Specifically, if an interchange box is faulty, data will not reasonable values of interchange box reliability there is a gain in network reliability as a result of an extra stage (see S. Thanawastien, "The shuffle/exchange-plus networks," presented at ACM Southeast Regional Conf., April 1982, to be published). It should also be noted that a failure in a stage n multiplexer or stage 0 demultiplexer has the effect of a link fault, which the ESC can tolerate as shown in this section.

Techniques such as test patterns (see T. Feng and C. Wu, "Fault-diagnosis for a class of multistage interconnection networks," IEEE Trans. Comput., vol. C-30, pp. 743–758, October 1981) or dynamic parity checking (see Siegel and McMillen, supra) for fault detection and location have been described for use in the Generalized Cube topology. Test patterns are used to determine network integrity globally by checking the data arriving at the network outputs as a result of N strings (one per input port) of test inputs. With dynamic parity checking, each interchange box monitors the status of boxes and links connected to its inputs by examining incoming data for correct parity. It is assumed that the ESC can be tested to determine the existence and location of faults. The present invention is concerned with how to recover once a fault is located. Recovery from such a fault is something of which the Generalized Cube and its related networks are incapable.

Single Fault Tolerance: One-to-One Connections

The ESC gets its fault-tolerant abilities by having redundant paths from any source to any destination. This is shown in the following theorem.

Theorem 1: In the ESC with both stages n and 0 enabled there exist exactly two paths between any source and any destination.

Proof: There is exactly one path from a source S to a destination D in the Generalized Cube (See Lawrie, supra). Stage n of the ESC allows access to two distinct stage $n-1$ inputs, S and cube$_0$(S). Stages $n-1$ to 0 of the ESC form a Generalized Cube topology, so the two stage $n-1$ inputs each have a single path to the destination and these paths are distinct (since they differ at stage $n-1$ at least).

The existence of at least two paths between any source/destination pair is a necessary condition for fault tolerance. Redundant paths allow continued communication between source and destination if after a fault at least one path remains functional. It can be shown that for the ESC two paths are sufficient to provide tolerance to single faults for one-to-one connections.

Lemma 1: The two paths between a given source and destination in the ESC with stages n and 0 enabled have no links in common.

Proof: A source S can connect to the stage $n-1$ inputs S or cube$_0$(S). These two inputs differ in the 0th, or low-order, bit position. Other than stage n, only stage 0 can cause a source to be mapped to a destination which differs from the source in the low-order bit position. Therefore, the path from S through stage $n-1$ input S to the destination D contains only links with labels which agree with S in the low-order bit position. Similarly, the path through stage $n-1$ input cube$_0$(S) contains only links with labels agreeing with cube$_0$(S) in the low-order bit position. Thus, no link is part of both paths.

Lemma 2: The two paths between a given source and destination in the ESC with stages n and 0 enabled have no interchange boxes from stages $n-1$ through 1 in common.

Proof: Since the two paths have the same source and destination, they will pass through the same stage n and 0 interchange boxes. No box in stages $n-1$ through 1 has input link labels which differ in the low-order bit position. One path from S to D contains only links with labels agreeing with S in the low-order bit position. The other path has only links with labels which are the complement of S in the low-order bit position. Therefore, no box in stages $n-1$ through 1 belongs to both paths.

Theorem 2: In the ESC with a single fault there exists at least one fault-free path between any source and destination.

Proof: Assume first that a link is faulty. If both stages n and 0 are enabled, Lemma 1 implies that at most one of the paths between a source and destination can be faulty. Hence, a fault-free path exists.

Now assume that an interchange box is faulty. There are two cases to consider. If the faulty box is in stage n or 0, the stage can be disabled. The remaining n stages are sufficient to provide one path between any source and destination (i.e., all n cube functions are still available.) If the faulty box is not in stage n or 0, Lemma 2 implies that if both stages n and 0 are enabled, then at most, one of the paths is faulty. So, again, a fault-free path exists.

Two paths exist when the fault is in neither of the two paths between source and destination.

Single Fault Tolerance: Broadcast Connections

The two paths between any source and destination of the ESC provide fault tolerance for performing broadcasts as well.

Theorem 3: In the ESC with both stages n and 0 enabled there exist exactly two broadcast paths for any broadcast performable on the Generalized Cube.

Proof: There is exactly one broadcast path from a source to its destinations in the Generalized Cube. Stage n of the ESC allows a source S access to two distinct stage $n-1$ inputs, S and cube$_0$(S). Any set of destinations to which S can broadcast, cube$_0$(S) can broadcast, since a one-to-many broadcast is just a collection of one-to-one connections with the same source.

Lemma 3: The two broadcast paths between a given source and destinations in the ESC with stages n and 0 enabled have no links in common.

Proof: All links in the broadcast path from the stage $n-1$ input S have labels which agree with S in the low-order bit position. All links in the broadcast path from the stage $n-1$ input cube$_0$(S) are the complement of S in the low-order bit position. Thus, no link is part of both broadcast paths.

Lemma 4: The two broadcast paths between a given source and its destinations in the ESC with stages n and 0 enabled have no interchange boxes from stage $n-1$ through 1 in common.

Proof: Since the two broadcast paths have the same source and destinations, they will pass through the same stage n and 0 interchange boxes. No box in stages $n-1$ through 1 has input link labels which differ in the low-order bit position. From the proof of Lemma 3, the link labels of the two broadcast paths differ in the low-order bit position. Therefore, no box in stages $n-1$ through 1 belongs to both broadcast paths.

Lemma 5: With stage 0 disabled and stage n enabled, the ESC can form any broadcast path which can be formed by the Generalized Cube.

Proof: Stages n through 1 of the ESC provide a complete set of n cube interconnection functions in the order cube$_0$, cube$_{n-1}$, ..., cube$_1$. A path exists between any source and destination with stage 0 disabled because all n cube functions are available. This is regardless of the order of the interconnection functions. So, a set of paths connecting an arbitrary source to any set of destinations exists. Therefore, any broadcast path can be formed.

Theorem 4: In the ESC with a single fault there exists at least one fault-free broadcast path for any broadcast performable by the Generalized Cube.

Proof: Assume that the fault is in stage 0, i.e., disable stage 0, enable stage n. Lemma 5 implies that a fault-free broadcast path exists. Assume that the fault is in a link or a box in stages $n-1$ to 1. From Lemmas 3 and 4, the two broadcast paths will have none of these network elements in common. Therefore, at least one broadcast path will be fault-free, possibly both. Finally, assume the fault is in stage n. Stage n will be disabled and the broadcast capability of the ESC will be the same as that of the Generalized Cube.

Single Fault Tolerance: Finding Fault-Free Paths

The ESC path routing S to D corresponding to the Generalized Cube path from S and D is called the primary path. This path must either bypass stage n or use the straight setting in stage n. The other path available to connect S to D is the secondary path. It must use the exchange setting in stage n. The concept of primary path can be extended for broadcasting. The broadcast path, or set of paths, in the ESC analogous to that available in the Generalized Cube is called the primary broadcast path. This is because each path, from the source to one of the destinations, is a primary path. If every primary path is replaced by its secondary path, the result is the secondary broadcast path.

Given S and D, the network links and boxes used by a path can be found. As discussed in Lawrie, supra, for the source/destination pair S and D the path followed in the Generalized Cube topology uses the stage i output labeled $d_{n-1} \ldots d_{i+1}d_is_{i-1} \ldots s_1s_0$. The following theorem extends this for the ESC.

Theorem 5: For the source/destination pair $S = s_{n-1} \ldots s_1s_0$ and $D = d_{n-1} \ldots d_1d_0$, the primary path uses the stage i output labeled $d_{n-1} \ldots d_{i+1}d_is_{i-1} \ldots s_1s_0$ and the secondary path uses $d_{n-1} \ldots d_{i+1}d_is_{i-1} \ldots s_1\overline{s_0}$, for $0 \leq i < n$.

Proof: Stage i, $i \neq 0$, is the only stage in the ESC that can map the ith bit of a source address (i.e., determine the ith bit of the destination). Thus, if S is to reach D, both ESC paths must use a stage i output with a label that matches D in the ith bit position. This matching occurs at each stage, so the high order $n-i$ bits of the output label will be $d_{n-1} \ldots d_{i+1}d_i$. As the output of stage i, bit positions $i-1$ to 1 have yet to be affected so they match source address bits $i-1$ to 1. The low-order bit position is unchanged by stage n for the primary path. The secondary path includes the cube$_0$ connection (exchange) in stage n; therefore the low-order bit position is complemented.

When a fault has been detected and located, each source will receive a fault label or labels uniquely specifying the fault location. This is accomplished by giving a stage number and a stage output number. For example, if the link between stages i and $i-1$ from the stage i output j fails, each source receives the fault label (i, j). If a box in stage i with outputs j and k fails, the pair of fault labels (i, j) and (i, k) is sent to each source. For a fault in stage 0, no fault label will be given, only notice that a stage 0 fault exists. This is because stage 0 will be disabled in the event of such a fault, so no path could include a stage 0 fault. Stage n faults require system maintenance but no labels need be issued, as the stage will be disabled.

A source can check to see if the primary path to its intended destination contains a fault. If the faulty component is in stage i, $0 < i < n$, the source forms $d_{n-1} \ldots d_{i+1}d_is_{i-1} \ldots s_1s_0$ and compares this with the fault label(s). If there is a match, then the primary path is faulty. If the primary path is fault-free, it will be used. If faulty, the secondary path will be fault-free and thus usable.

Since a broadcast to many destinations involves many paths from the source to the destinations, checking to see if one of the paths contains a fault may involve more computational effort than is desirable. To decide if the secondary broadcast path should be used, a simpler criterion than checking each path for the fault exists. For a fault in stage i, the test is to compare the low-order i bits of the source address and the label(s) of the faulty link or box. All paths must use links and stage $n-1$ to 1 boxes with labels that agree with the source address in the low-order bit positions. Thus, if the low-order i bits of the label(s) and the source address agree, then the fault may lie in the primary broadcast path. Using the secondary broadcast path avoids the possibility of encountering the fault. This method is computationally simpler than exhaustive path fault checking, but it can result in the unneeded use of the secondary broadcast path.

If there is no strong preference to using the primary versus secondary path (or broadcast path), the test to check for a fault can be reduced to just comparing on a single bit position. If the low-order source address bit and fault label bit agree, then the primary path (or broadcast path) may be faulty, so the secondary routing can be used. This simplified procedure will result in unnecessary use of secondary paths (one-to-one), and more unnecessary use of secondary broadcast paths.

Multiple Fault Tolerance

Theorems 2 and 4 establish the capability of the ESC to tolerate a single fault in the sense that any one-to-one or broadcast connection possible in the fault-free Generalized Cube network remains possible. In other words, the ESC with a single fault retains its fault-free interconnection capability. For some instances of multiple faults, the ESC also retains fault-free interconnection capability. The necessary and sufficient condition for this is that the primary and secondary paths are not both faulty.

As faults are detected and located, a system control unit can determine whether network interconnection capability is degraded.

Theorem 6: Let $A = (i, a_{n-1} \ldots a_1a_0)$ and $B = (j, b_{n-1} \ldots b_1b_0)$, where $1 \leq j \leq i \leq n-1$, be two fault labels. If $a_{n-1} \ldots a_{i+1}a_i \neq b_{n-1} \ldots b_{i+1}b_i$, or if $a_{j-1} \ldots a_1\overline{a_0} \neq b_{j-1} \ldots b_1b_0$, then there will be at least one fault-free path between any source and destination.

Proof: A fault-free path will exist for a source/destination pair S/D. If taken together the fault labels A and B do not indicate blockage of both the primary and secondary paths. As shown in Theorem 5, the primary path uses stage i output $d_{n-1} \ldots d_{i+1}d_is_{i-1} \ldots s_1s_0$ and the secondary path uses $d_{n-1} \ldots d_{i+1}d_is_{i-1} \ldots s_1\overline{s_0}$. The stage j outputs used are $d_{n-1} \ldots d_{j+1}d_js_{j-1} \ldots s_1s_0$ and $d_{n-1} \ldots d_{j+1}d_js_{j-1} \ldots s_1\overline{s_0}$. Without a loss of generality, it is assumed that $j \leq i$. Thus, at stages i and j the primary and secondary paths both use outputs with the same bits in positions $n-1$ through $j-1$ through 1, and complementary values in position 0. If $a_{n-1} \ldots a_{i+1}a_i \neq b_{n-1} \ldots b_{i+1}b_i$ then at least one of the faults is in neither the primary nor the secondary path, so at least one of the paths if fault-free. Similarly, if $a_{j-1} \ldots a_1\overline{a_0} \neq b_{j-1} \ldots b_1b_0$ at least one fault is in neither path, so at least one path is fault-free.

With multiple faults are detected and located in the ESC a system control unit must determine the appropriate action. Theorem 6 is applied if the multiple faults occur in stages $n-1$ to 1. The fault label(s) of any new fault(s) is compared with any existing fault label(s). If each pair of fault labels meets the test of Theorem 6, then the network retains its fault-free interconnection capability. (Note that the two fault labels associated with a faulty box do satisfy the requirement of Theorem 6 since for stages $n-1$ through 1, the low-order bits of such labels agree, satisfying the Theorem 6 criterion $a_{j-1} \ldots a_1\overline{a_0} \neq b_{j-1} \ldots b_1b_0$). With multiple stage 0 or multiple stage n faults only, the stage is simply disabled, as for a single fault; fault-free interconnection capability still exists.

If a fault-free interconnection capability exists, full operation may continue. To continue, the additional fault label(s) are sent to each source. However, a source must now check a primary path against a longer list of fault labels to determine if that path is fault-free. Therefore, system performance may be degraded somewhat.

If faults exist in both stages n and 0, or if there are faults in stages $n-1$ through 1 and either stage n or 0, complete fault-free interconnection capability in the ESC is impossible. Also, where some pair of fault labels fails the test of Theorem 6, complete fault-free interconnection capability is lost.

For an SIMD system where interconnection network routing requirements are limited to a relatively small number of known mappings, multiple faults that preclude fault-free interconnection capability might not impact system function. This would occur if all needed permutations could be performed (although each would take two passes). Similar faults in MSIMD or MIMD systems may leave some processes unaffected. For these situations, and if fail-soft capability is important, it is useful to determine which source/destination pairs are unable to communicate. The system might then attempt to reschedule processes such that their needed communication paths will be available, or assess the impact the faults will have on its performance and report to the user.

Corollary 1: Let $A=(i,a_{n-1}\ldots a_1a_0)$ and $B=(j, b_{n-1}\ldots b_1b_0)$, where $1\leq j\leq i\leq n-1$, be two fault labels. If $a_{n-1}\ldots a_{i+1}a_i=b_{n-1}\ldots b_{i+1}b_i$ and $a_{j-1}\ldots a_1\bar{a}_0=b_{j-1}\ldots b_1b_0$, then there exist source/destination pairs for which no fault-free path exists. These pairs are such that $s_{i-1}\ldots s_2s_1=a_{i-1}\ldots a_2a_1$, $d_{n-1}\ldots d_{j+1}d_j=b_{n-1}\ldots b_{j+1}b_j$, and $s_{n-1}\ldots s_{i+1}s_i,s_0$, and $d_{j-1}\ldots d_1d_0$ are arbitrary.

Proof: From Theorem 5, the two paths between a source and destination use stage k outputs which differ only in the low-order bit, $1\leq k\leq n-1$. Assume that a path contains the fault denoted by A. Then the stage i output used is such that $d_{n-1}\ldots d_{i+1}d_is_{i-1}\ldots s_2s_1x=a_{n-1}\ldots a_1a_0$ and the stage j output used must be $d_{n-1}\ldots d_{j+1}d_js_{j-1}\ldots s_2s_1x$, where x may equal $s_0$ or $\bar{s}_0$ depending on whether the path is primary or secondary. Now $a_{n-1}\ldots a_{i+1}a_i=b_{n-1}\ldots b_{i+1}b_i$ and $a_{j-1}\ldots a_1\bar{a}_0=b_{j-1}\ldots b_1b_0$. Thus, the alternate path uses stage j output $d_{n-1}\ldots d_{j+1}d_js_{j-1}\ldots s_2s_1\bar{x}=a_{n-1}\ldots a_{i+1}a_id_{i-1}\ldots d_{j+1}d_ja_{j-1}\ldots a_1\bar{a}_0=b_{n-1}\ldots b_{i+1}b_id_{i-1}\ldots d_{j+1}d_jb_{j-1}\ldots b_1b_0$. If $d_{i-1}\ldots d_{j+1}d_j=b_{i-1}\ldots b_{j+1}b_j$, then the alternate path contains the fault denoted by B. Therefore, there exist source/destination pairs for which no fault-free path exists.

The relationships $d_{n-1}\ldots d_{i+1}d_is_{i-1}\ldots s_2s_1x=a_{n-1}\ldots a_1a_0$ and $d_{n-1}\ldots d_{j+1}d_js_{j-1}\ldots s_2s_1\bar{x}=b_{n-1}\ldots b_1b_0$ yield the constraints on the source and destination addresses of $s_{i-1}\ldots s_2s_1=a_{i-1}\ldots a_2a_1$ and $d_{n-1}\ldots d_{j+1}d_j=b_{n-1}\ldots b_{j+1}b_j$. The values of $s_{n-1}\ldots s_{i+1}s_i$, $s_0$, and $d_{j-1}\ldots d_1d_0$ are unconstrained.

For broadcast paths, continued operation under multiple faults is somewhat more complicated as faults can exist in both a primary and secondary broadcast path without comprising fault-free (one-to-one) interconnection capability. The checks to determine if a primary path may contain a fault which were described in "Single Fault Tolerance: Finding Fault-Free Paths" can be applied in this case. To check for a possible fault in a secondary path, $\bar{s}_0$ is used in place of $s_0$. If both paths contain faults, a combination of primary and secondary paths can be used to perform the broadcast. However, this procedure may be too time-consuming to be practical.

The exact conditions under which no fault-free broadcast path exists can be determined and the affected broadcasts characterized.

Corollary 2: Let $A=(i,a_{n-1}\ldots a_1a_0)$ and $B=(j,b_{n-1}\ldots b_1b_0)$, where $1\leq j\leq i\leq n-1$, be any two fault labels. If $a_{j-1}\ldots a_1\bar{a}_0=b_{j-1}\ldots b_1b_0$, then there exist broadcasts for which no fault-free broadcast path exists. These broadcasts are such that $s_{i-1}\ldots s_2s_1=a_{i-1}\ldots a_2a_1, d_{n-1}^k\ldots d_{i+1}^kd_i^k=a_{n-1}\ldots a_{i+1}a_i$, and $d_{n-1}^l\ldots d_{j+1}^ld_j^l=b_{n-1}\ldots b_{j+1}b_j$, where $S=s_{n-1}\ldots s_1s_0$ is the source and $D^k=d_{n-1}^k\ldots d_1^kd_0^k$ and $D^l=d_{n-1}^l\ldots d_1^ld_0^l$ are two of the destinations (and are not necessarily distinct).

Proof: In general, a broadcast path uses stage i outputs of the form $d_{n-1}\ldots d_{i+1}d_is_{i-1}\ldots s_2s_1x$, where x equals $s_0$ or $\bar{s}_0$ depending on whether the broadcast path is primary or secondary, and $D=d_{n-1}\ldots d_1d_0$ represents one of the broadcast destinations. As a consequence of Theorem 5, the two broadcast paths from a source to a set of destinations use stage m outputs which differ only in the low-order bit, where $1\leq m\leq n-1$. Thus, the alternate broadcast path uses stage j outputs of the form $d_{n-1}\ldots d_{j+1}d_js_{j-1}\ldots s_2s_1\bar{x}$. To construct those broadcasts whose primary and secondary paths are faulty due to faults A and B, consider the following. Let the source $S=s_{n-1}\ldots s_1s_0$ be such that $s_{n-1}\ldots s_2s_1=a_{n-1}\ldots a_2a_1$, and, without loss of generality let $x=a_0$. Let $D^k=d_{n-1}^k\ldots d_1^kd_0^k$, one of the destinations, be such that $d_{n-1}^k\ldots d_{i+1}^kd_i^k=a_{n-1}\ldots a_{i+1}a_i$. Let $D^l=d_{n-1}^l\ldots d_1^ld_0^l$, another destination (not necessarily distinct from $D^k$), be such that $d_{n-1}^l\ldots d_{j+1}^ld_j^l=b_{n-1}\ldots b_{j+1}b_j$. Given $a_{j-1}\ldots a_1\bar{a}_0=b_{j-1}\ldots b_1b_0$, then the equalities $d_{n-1}^k\ldots d_{i+1}^kd_i^ks_{i-1}\ldots s_2s_1x=a_{n-1}\ldots a_1a_0$ and $d_{n-1}^l\ldots d_{j+1}^ld_j^ls_{j-1}\ldots s_2s_1\bar{x}=b_{n-1}\ldots b_1b_0$ are true. Any broadcast for which the equalities hold does not have a fault-free primary or secondary broadcast path.

ROUTING TAGS

The use of routing tags to control the Generalized Cube topology has been discussed in Lawrie, supra and Siegel and McMillen, supra. A broadcast routing tag has also been developed (see Siegel and McMillen, supra and K. Y. Wen, "Interprocessor connections—Capabilities, exploitation, and effectiveness," Ph.D. dissertation, Dept. Comput. Sci., Univ. of Illinois, Urbana, Rep. UIUCDCS-R-76-830, October 1976, 170 pp.). The details of one routing tag scheme are summarized here to provide a basis for describing the necessary modifications for use in the ESC.

Figure 4:
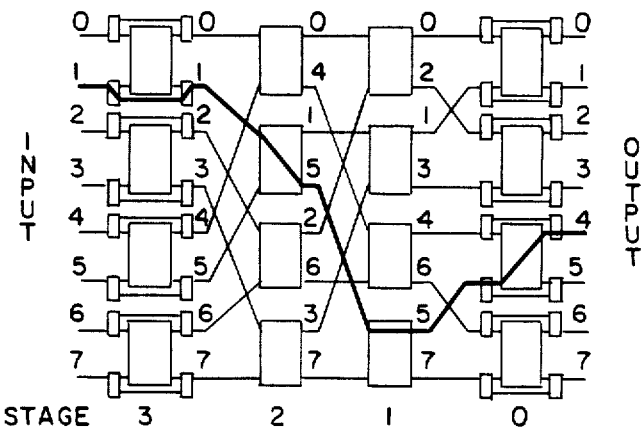
FIG. 4 illustrates in heavier lines a path used when routing from 1 to 4 in a fault-free ESC.

For one-to-one connections, an n-bit tag is computed from the source address S and the destination address D. The routing tag $T=S\oplus D$, where $\oplus$ means bitwise EXCLUSIVE-OR (see Siegel and McMillen, supra). Let $t_{n-1}\ldots t_1t_0$ be the binary representation of T. To determine its required setting, an interchange box at stage i need only examine $t_i$. If $t_i=0$, the straight state is used; if $t_i=1$, an exchange is performed. For example, given $S=001$ and $D=100$, then $T=101$, and the box settings are exchange, straight, and exchange. FIG. 4 illustrates this route in a fault-free ESC.

The routing tag scheme can be extended to allow broadcasting from a source to a power of two destinations with one constraint. That is, if there are $2^j$ destinations, $0\leq j\leq n$, then the Hamming distance (number of differing bit positions) (see S. Lin, An Introduction to Error Correcting Codes, Englewood Cliffs, NJ: Prentice-Hall, 1970, p. 43) between any two destination addresses must be less than or equal to j (see Siegel and McMillen, supra). Thus, there is a fixed set of j bit positions where any pair of destination addresses may disagree, and $n-j$ positions where all agree. For example, the set of addresses {010, 011, 110, 111} meets the criterion.

To demonstrate how a broadcast routing tag is constructed, let S be the source address and $D^1, D^2, \ldots,$ $D^{2^j}$ be the $2^j$ destination addresses. The routing tags are $T_i = S \oplus D^i$, $1 \leq i \leq 2^j$. These tags will differ from each other only in the same j bit positions in which S may differ from $D^i$, $0 < i \leq 2^j$.

The broadcast routing tag must provide information for routing and determining branching points. Let the routing information be $R = r_{n-1} \ldots r_1 r_0$ and the broadcast information be $B = b_{n-1} \ldots b_1 b_0$. The j bits where tags $T_i$ differ determine the stages in which broadcast connections will be needed. The broadcast routing tag {R, B} is constructed by setting $R = T_i$ for any i, and $B = D^k \oplus D^l$, where $D^k$ and $D^l$ are any two destinations which differ by j bits.

Figure 5:
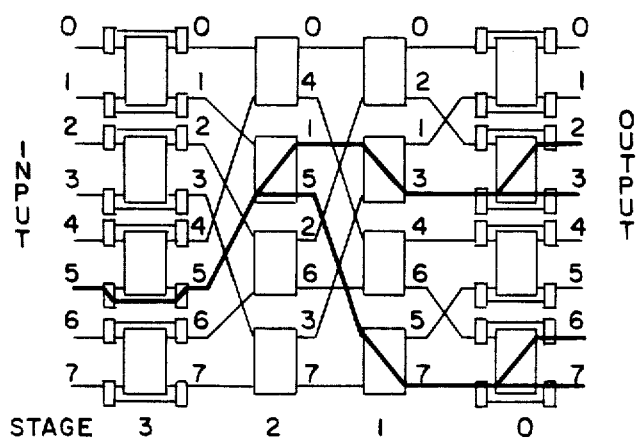
FIG. 5 illustrates in heavier lines a broadcast path used when broadcasting from 5 to 2, 3, 6, and 7 in a fault-free ESC.

To interpret {R, B}, an interchange box in stage i must examine $r_i$ and $b_i$. If $b_i = 0$, $r_i$ has the same effect as $t_i$, the ith bit of the one-to-one connection tag. If $b_i = 1$, $r_i$ is ignored and an upper or lower broadcast is performed depending upon whether the route uses the upper or lower box input. For example, if S = 101, $D^1 = 010, D^2 = 011, D^3 = 110$, and $D^4 = 111$, then R = 111 and B = 101. The network configuration for this broadcast is shown in FIG. 5 for a fault-free ESC.

Both routing tags and broadcast routing tags for the ESC, which take full advantage of its fault-tolerant capabilities, can be derived from the tag schemes for the Generalized Cube. The ESC uses n+1 bit routing tags $T' = t'_n \ldots t'_1 t'_0$ and broadcast routing tags {R', B'}, $R' = r'_n \ldots r'_1 r'_0$ and $B' = b'_n \ldots b'_1 b'_0$. The additional bit position is to control stage n. Actual tag values depend on whether the ESC has a fault as well as source and destination addresses, but are readily computed.

First consider the fault-free case. For both routing and broadcast tags, the nth bit will be ignored since stage n is disabled when there are no faults. The routing tag is given by $T' = t'_n t_{n-1} \ldots t_1 t_0$, where $t_{n-1} \ldots t_1 t_0 = T$, the tag used in the Generalized Cube. The bit $t'_n$ may be set to any convenient value. The bits of T' are interpreted in the same way as tag bits in the Generalized Cube scheme. The broadcast routing tag is composed of $R' = r'_n r_{n-1} \ldots r_1 r_0$ and $B' = b'_n b_{n-1} \ldots b_1 b_0$, where $r_{n-1} \ldots r_1 r_0 = R$, $b_{n-1} \ldots b_1 b_0 = B$, and $r'_n$ and $b'_n$ are arbitrary. Again, the bits of R', B' have the same meaning as in the Generalized Cube.

Now routing tag and broadcast routing tag definitions for use in the ESC with a fault will be described. With regard to routing tags, the primary path in the ESC is that corresponding to the tag $T' = 0 t_{n-1} \ldots t_1 t_0$, and the secondary path is that associated with $T' = 1 t_{n-1} \ldots t_1 t_0$. The primary broadcast path is specified by $R' = 0 r_{n-1} \ldots r_1 r_0$ and $B' = 0 b_{n-1} \ldots b_1 b_0$, whereas $R' = 1 r_{n-1} \ldots r_1 r_0$ and $B' = 0 b_{n-1} \ldots b_1 b_0$ denote the secondary broadcast path.

It is assumed that the system has appropriately reconfigured the network and distributed fault labels to all sources as required. With the condition of the primary path known, a routing tag that avoids the network fault can be computed.

Theorem 7: For the ESC with one fault, any one-to-one connection performable on the Generalized Cube with the routing tag T can be performed using the routing tag T' obtained from the following rules.

(1) If the fault is in stage 0, use $T' = t_0 t_{n-1} \ldots t_1 t_0$.

(2) If the fault is in a link or a box in stages n−1 to 1 and the primary path is fault-free, use $T' = 0 t_{n-1} \ldots t_1 t_0$. If the primary path is faulty, use the secondary path $T' = 1 t_{n-1} \ldots t_1 t_0$.

(3) If the fault is in stage n, use $T' = t'_n t_{n-1} \ldots t_1 t_0$, where $T'_n$ is arbitrary.

Proof: Assume that the fault is in stage 0, i.e., stage n will be enabled and stage 0 disabled. Since stage n duplicates stage 0 (both perform $cube_0$), a routing can be accomplished by substituting stage n for stage 0. The tag $T' = t_0 t_{n-1} \ldots t_1 t_0$ does this by placing a copy of $t_0$ in the nth bit position. Stage n then performs the necessary setting. Note that the low-order bit position of T', $t_0$, will be ignored since stage 0 is disabled.

Assume that the fault is in a link or a box in stage n−1 to 1. T specifies the primary path. If this path is fault-free, setting $T' = 0 t_{n-1} \ldots t_1 t_0$ will use this path. The 0 in the nth bit position is necessary because stages n and 0 are enabled, given the assumed fault location. If the path denoted by T contains the fault, then the secondary path is fault-free by Theorem 2 and must be used. It is reached by setting the high-order bit of T' to 1. This maps S to the input $cube_0(S)$ of stage n−1. To complete the path to D, bits n−1 to 0 of T' must be $cube_0(S) \oplus D = t_{n-1} \ldots t_1 t_0$. Thus, $T' = 1 t_{n-1} \ldots t_1 t_0$.

Finally, assume that the fault is in stage n. Stage n will be disabled, and the routing tag needed will be the same as in the fault-free ESC.

Recall from the section "Single Fault Tolerance: Finding Fault-Free Paths" that the procedure for determining if a primary broadcast path is faulty may result in unnecessary use of the secondary broadcast path. As the following theorem shows, generating broadcast routing tags to use the secondary broadcast path incurs minimal additional overhead relative to primary broadcast path tags.

Theorem 8: For the ESC with one fault, any broadcast performable on the Generalized Cube with the broadcast routing tag {R, B} can be performed using the broadcast routing tag {R', B'} obtained from the following rules.

(1) If the fault is in stage 0, use $R' = r_0 r_{n-1} \ldots r_1 r_0$ and $B' = b_0 b_{n-1} \ldots b_1 b_0$.

(2) If the fault is in a link or a box in stages n−1 to 1 and the primary broadcast path is fault-free, use $R' = 0 r_{n-1} \ldots r_1 r_0$ and $B' = 0 b_{n-1} \ldots b_1 b_0$. If the secondary broadcast path has been chosen, use $R' = 1 r_{n-1} \ldots r_1 r_0$ and $B' = 0 b_{n-1} \ldots b_1 b_0$.

(3) If the fault is in stage n, use $R' = r'_n r_{n-1} \ldots r_1 r_0$ and $B' = b'_n b_{n-1} \ldots b_1 b_0$, where $r'_n$ and $b'_n$ are arbitrary.

Proof: Assume that the fault is in stage 0. As a direct consequence of Lemma 5, any broadcast performable on the Generalized Cube using the broadcast routing tag {R, B} is performable on the ESC with stage 0 disabled and stage n enabled (i.e., stage 0 faulty). The broadcast routing tag substitutes stage n for stage 0 by having $r_0$ and $b_0$ copied into $r'_n$ and $b'_n$, respectively. This results in the same broadcast because the order in which the interchange functions are applied is immaterial for one-to-one routing and broadcasting. Specifically, if $r_i = 0$ and $b_i = 0$, then in the set of destination addresses, $d_i = s_i$; if $r_i = 1$ and $b_i = 0$, then $d_i = \bar{s}_i$; and if $b_i = 1$, then $d_i$ can be 1 or 0. When $b_0 = 0$ and there is a fault in stage 0, if $r_0 = 0$, the primary broadcast path is used, and if $r_0 = 1$, the secondary braodcast is used. When $b_0 = 1$ and stage 0 is faulty, the stage n interchange box routing the message performs a broadcast, and a combination of primary and secondary paths connect the source to its destinations. Each address bit is affected individually, making the order of stages irrelevant.

Assume that the fault is in a link or a box in stages n−1 to 1. {R, B} specifies the primary broadcast path. If it is fault-free, setting $R' = 0 r_{n-1} \ldots r_1 r_0$ and $B'=0b_{n-1}\ldots b_1b_0$ will use this broadcast path. If the primary broadcast path contains the fault then the secondary broadcast path is fault-free as a consequence of Theorem 4. Setting $R'=1r_{n-1}\ldots r_1\overline{r_0}$ and $B'=0b_{n-1}\ldots b_1b_0$ causes the broadcast to be performed using the secondary broadcast path.

Finally, assume the fault is in stage n. Stage n will be disabled, and the broadcast routing tag needed will be the same as in the fault-free ESC.

Theorems 7 and 8 are important for MIMD operation of the network because they show that the fault-tolerant capability of the ESC is available through simple manipulation of the usual routing or broadcast tags. Table I summarizes routing tags and Table II summarizes broadcast routing tags for the ESC.

TABLE I
ONE-TO-ONE ROUTING TAGS FOR THE ESC

| Fault Location | Routing Tag T' |
| --- | --- |
| No Fault | $T' = t'_n t_{n-1} \ldots t_1 t_0$ |
| Stage 0 | $T' = t_0 t_{n-1} \ldots t_1 t_0$ |
| Stage i, $0 < i < n$, or any link | $T' = 0 t_{n-1} \ldots t_1 t_0$ if primary path is fault-free; $T' = 1 t_{n-1} \ldots t_1 t_0$ if primary path contains fault |
| Stage n | $T' = t'_n t_{n-1} \ldots t_1 t_0$ |

TABLE II
BROADCAST ROUTING TAGS FOR THE ESC

| Fault Location | Broadcast Routing Tag (R', B') |
| --- | --- |
| No Fault | $R' = r'_n r_{n-1} \ldots r_1 r_0$ <br> $B' = b'_n b_{n-1} \ldots b_1 b_0$ |
| Stage 0 | $R' = r_0 r_{n-1} \ldots r_1 \overline{r_0}$ <br> $B' = b_0 b_{n-1} \ldots b_1 \overline{b_0}$ |
| Stage i, $0 < i < n$, or any link | $R' = 0 r_{n-1} \ldots r_1 r_0$ <br> $B' = 0 b_{n-1} \ldots b_1 b_0$ if primary broadcast path is fault-free; $R' = 1 r_{n-1} \ldots r_1 \overline{r_0}$ <br> $B' = 0 b_{n-1} \ldots b_1 b_0$ if primary broadcast path contains fault |
| Stage n | $R' = r'_n r_{n-1} \ldots r_1 r_0$ <br> $B' = b'_n b_{n-1} \ldots b_1 b_0$ |

In the case of multiple faults where the conditions of Theorem 6 are met (i.e., there exists at least one fault-free path between any source and destination), routing tag utility is unchanged. That is, each source checks the primary path for faults, but against a longer list of fault labels. The routing tag is still formed as in rule 2 of Theorem 7.

Broadcast tags can be used to determine if the primary or secondary broadcast path of the broadcast specified by the tag contains a fault. To check if a fault in stage i is in the primary broadcast path, the source constructs $L = l_{n-1} \ldots l_1 l_0$ such that for $0 \leq j < i$, $l_j = s_j$ and for $i \leq j \leq n-1$, if $b_j = 1$ then $l_j = x$ (DON'T CARE), otherwise $l_j = s_j \oplus r_j$. If L matches a fault label (with "x" matching 0 or 1), then the primary path contains a fault. Note that if $\overline{s_0}$ is used in place of $s_0$, the secondary broadcast path can be checked. This test can be used for both single faults and multiple faults (by repeating the test for each fault label).

PARTITIONING

The partitionability of a network is the ability to divide the network into independent subnetworks of different sizes (see H. J. Siegel, "The theory underlying the partitioning of permutation networks," supra). Each subnetwork of size $N' < N$ must have all the interconnection capabilities of a complete network of that same type built to be of size $N'$. A partitionable network allows an MSIMD, partitionable SIMD/MIMD, or MIMD machine to be dynamically reconfigured into independent subsystems.

Figure 6:
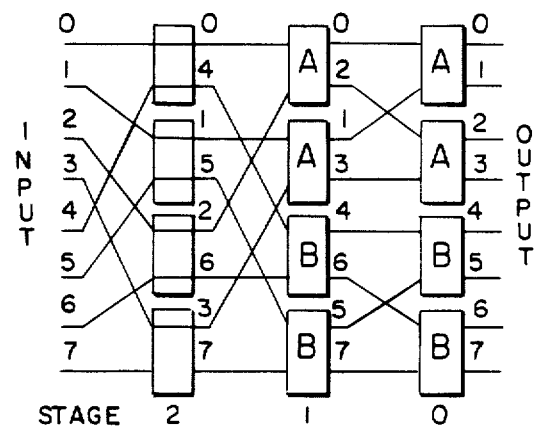
FIG. 6 illustrates a Generalized Cube network with N=8 partitioned into two subnetworks of size N'=4, based on the high-order bit position, with the A and B labels denoting the two subnetworks.

The Generalized Cube can be partitioned into two subnetworks of size N/2 by forcing all interchange boxes to the straight state in any one stage (see Siegel, supra). All the input and output port addresses of a subnetwork will agree in the ith bit position if the stage that is set to all straight is the ith stage. For example, FIG. 6 shows how a Generalized Cube with N=8 can be partitioned on stage 2, or the high-order bit position, into two subnetworks with N'=4. Since both subnetworks have all the properties of a Generalized Cube, they can be further subdivided independently. This allows the network to be partitioned into varying size groupings that are powers of two. For example, a network of size N=64 could be partitioned into subnetworks of sizes 32, 16, 8, 4, and 4.

The ESC can be partitioned in a similar manner, with the property that each subnetwork has the attributes of the ESC, including fault tolerance. The only constraint is that the partitioning cannot be done using stage n or stage 0.

Theorem 9: The ESC can be partitioned with respect to any stage except stages n and 0.

Proof: The cube functions n−1 through 1 each occur once in the ESC. Setting stage i, $1 \leq i \leq n-1$, to all straight separates the network input and output ports into two independent groups. Each group contains ports whose addresses agree in the ith bit position, i.e., all addresses have their ith bits equal to 0 in one group, and 1 in the other. The other n stages provide the cube$_j$ functions for $0 \leq j < n$ and $j \neq i$, where cube$_0$ appears twice. This comprises an ESC network for the N/2 ports of each group. As with the Generalized Cube, each subnetwork can be further subdivided. Since the addresses of the interchange box outputs and links of a primary path and a secondary path differ only in the 0th bit position, both paths will be in the same partition (i.e., they will agree in the bit position(s) upon which the partitioning is based). Thus, the fault-tolerant routing scheme of the ESC is compatible with network partitioning.

If partitioning is attempted on stage n, the results will clearly be a Generalized Cube topology of size N. Attempting to partition on stage 0 again yields a network of size N, in particular a Generalized cube with cube$_0$ first, not last. In neither case are independent subnetworks formed.

Figure 7:
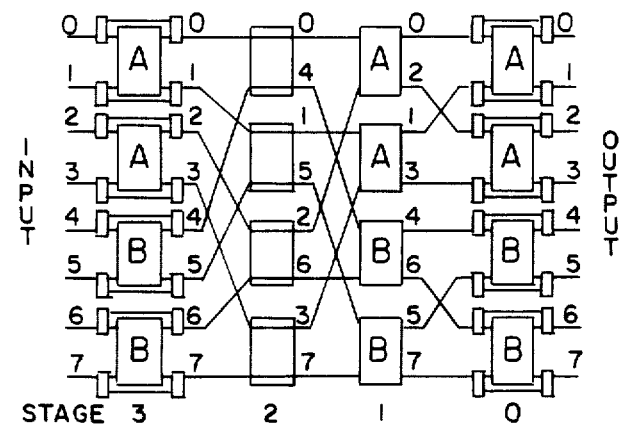
FIG. 7 illustrates an ESC network with N=8 partitioned into two subnetworks of size N'=4, based on the high-order bit position, with the A and B labels denoting the two subnetworks.

In FIG. 7, the ESC for N=8 is shown partitioned with respect to stage 2. The two subnetworks are indicated by the labels A and B. Subnetwork A consists of ports 0, 1, 2, and 3. These ports addresses agree in the high-order bit position (it is 0). Subnetwork B contains ports 4, 5, 6, and 7, all of which agree in the high-order bit position (it is 1).

Partitioning can be readily accomplished by combining routing tags with masking (see, Siegel and McMillen, supra). By logically ANDing tags with masks to force to 0 those tag positions corresponding to interchange boxes that should be set to straight, partitions can be established. This process is external to the network and, so, independent of a network fault. Thus, partitioning is unimpeded by a fault.

PERMUTING

In SIMD mode, generally all or most sources will be sending data simultaneously. Sending data from each source to a single, distinct destination is referred to as permuting data from input to output. A network can perform or pass a permutation if it can map each source to its destination without conflicts. Conflict is when two or more paths include the same stage output.

The fault-free ESC clearly has the same permuting capability as the Generalized Cube. That is, any permutation performable by the Generalized Cube is performable by the ESC. If stage n in a fault-free ESC is enabled, the permuting capability is a superset of the Generalized Cube. Also, the ESC routing tags discussed in the "Routing Tags" section are entirely suitable for use in an SIMD environment.

Because of its fault-tolerant nature, it is possible to perform permutations on the ESC with a single fault, unlike the Generalized Cube. It can be shown that in this situation two passes are sufficient to realize any Generalized Cube performable permutation.

Theorem 10: In the ESC with one fault all Generalized Cube performable permutations can be performed in at most two passes.

Proof: If a stage n interchange box is faulty, the stage is bypassed and the remainder of the ESC performs any passable permutation with a single pass. If the fault is in a stage 0 box, the permutation can be accomplished in two passes as follows. In the first pass, stages n and 0 are bypassed and the remaining stages are set as usual. On the second pass, stage n is set as stage 0 would have been, stages n−1 through 1 are set to straight, and stage 0 is again bypassed. This simulates a pass through a fault-free network.

While stages n to 1 of the ESC provide the complete set of cube interconnection functions found in the Generalized Cube, a single pass through the stages in this order does not duplicate its permuting capability. For example, the Generalized Cube can perform a permutation which includes the mappings 0 to 0 and 1 to 2. Stages n to 1 of the ESC cannot do this. The order of the stages is important. Thus, the two pass procedure given is necessary.

When the fault is in a link or a box in stages n−1 to 1, then at the point of the fault there are less than N paths through the network. Thus, N paths cannot exist simultaneously. The permutation can be completed in two passes in the following way. First, all sources with fault-free primary paths to their destinations are routed. One source will not be routed if the failure was in a link, two if in a box. With a failed link, the second pass routes the remaining source to its destination using its fault-free secondary path. With a faulty box, the secondary paths of the two remaining sources will also route to their destinations without conflict. Recall that paths conflict when they include the same box output. From Theorem 5, the primary path output labels for these two paths at stage i are $d_{n-1}^1 \ldots d_{i+1}^1 d_i^1 s_{i-1}^1 \ldots s_1^1 s_0^1$ and $d_{n-1}^2 \ldots d_{i+1}^2 d_i^2 s_{i-1}^2 \ldots s_1^2 s_0^2$, $0 \leq i < n$, where the superscripts distinguish the two paths. Note that $d_i^1 = \overline{d_i^2}$ and that the two source addresses are distinct. Thus, the stage i output labels of the two primary paths are distinct. The secondary path stage i output labels differ from the primary path labels only by complementing the 0th bit position. Therefore, the secondary paths are also distinct.

Permutation passing can be extended naturally to the multiple fault situation.

Corollary 3: In the ESC with multiple faults but retaining fault-free interconnection capability, all Generalized Cube performable permutations can be performed in at most two passes.

Proof: For a performable permutation, the primary paths between each source/destination pair are by definition pairwise non-conflicting. From the proof of Theorem 10, if two primary paths do not conflict, then their two associated secondary paths do not conflict. Thus, there is no conflict among the secondary paths. Therefore, in the ESC with multiple faults but retaining fault-free interconnection capability, a permutation can be performed by first passing data over those primary paths which are fault-free and then passing the remaining data using secondary paths.

For multiple faults in stage n, that stage is disabled and permutations are performed in one pass. With multiple faults in stage 0, the same procedure for the case of a single stage 0 fault is used, performing permutation in two passes.

Further variations of the ESC network can be derived from the Generalized Cube network. These variations as a group comprise a class of fault-tolerant networks, all of the ESC type.

Figure 8:
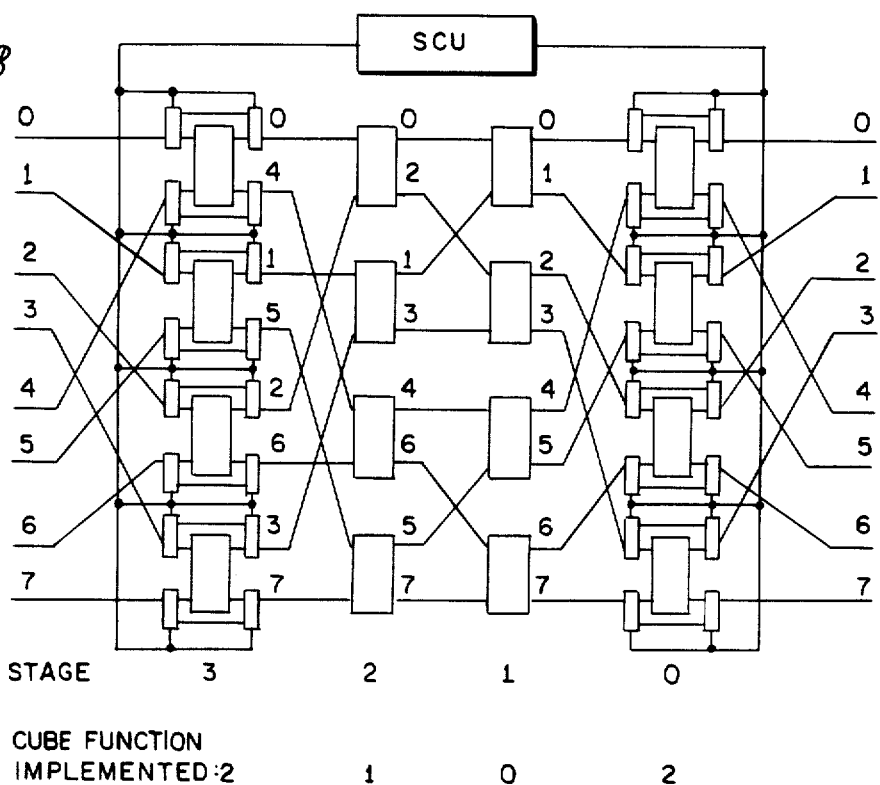
FIG. 8 illustrates a network of the ESC class with N=8 which is partitionable on the low-order bit position.

The ESC, as defined, cannot support partitioning based on stage 0, or the low-order bit position. An ESC-type network can be constructed to support low-order bit position partitioning. Beginning with a Generalized Cube, an extra stage which implements cube n−1 is added to the output side of the network. This is shown in FIG. 8 for N=8. From the input to the output, the stages implement $cube_{n-1}$, $cube_{n-2}$, ..., $cube_1$, $cube_0$, and $cube_{n-1}$. The same fault-tolerant capabilities are available in this network, but partitioning can be done on the low-order bit position. This partitioning can be done because the $cube_0$ function is no longer performed by stage 0, but by stage 1. Partitioning is possible on stages n−1 through 1 of any network in the ESC class of networks.

The ESC network is a particular instance of a class of fault-tolerant networks, all of which share four underlying characteristics. These characteristics are as follows:

(1) There are n+1 stages in the networks.

(2) Two stages implement the same $cube_i$ function, $0 \leq i \leq n-1$, and the remaining n−1 stages implement the $cube_j$ functions for all j, $0 \leq j \leq n-1$ and $j \neq i$.

(3) The two stages implementing $cube_i$ are stage n and stage 0. The assignment of the $cube_j$ functions to stages n−1 through 1 is arbitrary.

(4) Stage n and stage 0 can each be independently enabled or disabled.

Figure 9:
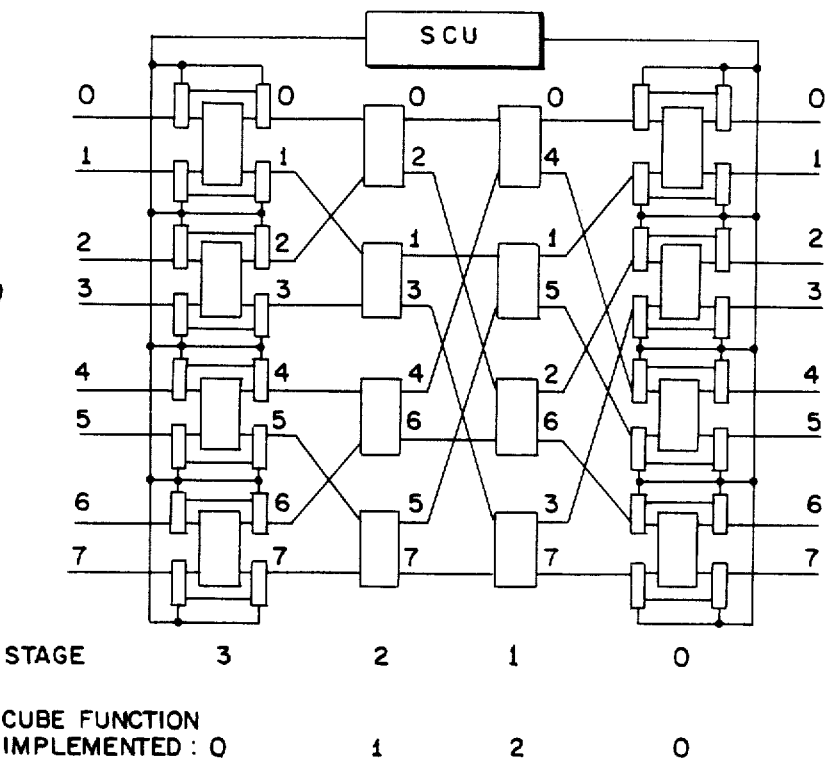
FIG. 9 illustrates a network of the ESC class with N=8 which implements the cube functions in the order $cube_0$, $cube_1$, $cube_2$, $cube_0$ from input to output.

FIG. 9 shows an ESC-class network which implements the cube functions in the order $cube_0$, $cube_1$, $cube_2$, $cube_0$, for N=8.

All networks of this class are single fault-tolerant. Routing tags for one-to-one and broadcast connections are analogous to those defined for the ESC. The order of the routing tag and broadcast routing tag bits need only correspond to the order in which the cube functions are implemented. Partitioning can be performed on stages n−1 through 1. The set of permutations performable in a single pass will differ from network to network of the ESC class because permuting capability depends on the order in which the stages implement the cube functions. Thus, every network in the ESC-class has all of the properties of the particular ESC network described; the only difference is that the set of permutations performable in a single pass through the networks may vary.

The reliability of large-scale multiprocessor supersystems is a function of system structure and the fault tolerance of system components. Fault-tolerant intercommunication networks can aid in achieving satisfactory reliability.

The ESC network is derived from the Generalized Cube network but has fault tolerance. The fault-tolerant capabilities of the ESC topology and the partitioning and permuting abilities of the ESC have been discussed. An adaptation of the routing tag and broadcast routing tag schemes designed for the Generalized Cube has been described. This permits the use of tags to control a faulted or fault-free ESC.

The family of multistage interconnection networks of which the Generalized Cube is representative has received much attention in the literature. These networks have been proposed for use in supersystems such as PASM, PUMPS, the Ballistic Missile Defense Agency test bed, Ultracomputer, the Numerical Aerodynamic Simulator, and data flow machines. The ESC has the capabilities of the Generalized Cube plus fault tolerance for a relatively low additional cost. Distributed control of the network with routing tags is possible. The ESC is a useful interconnection network for large-scale parallel/distributed supersystems.

What is claimed is:

1. A multistage data routing system comprising a cube comprising a plurality of stages sequentially numbered $n-1$ through 0, an extra stage n situated to precede stage $n-1$ of the cube, extra stage n and stage 0 including means for selectively bypassing stage n or stage 0 or neither stage n nor stage 0.

2. The routing system as recited in claim 1 wherein each of stages n through 0 comprises a plurality of network interchange boxes, each network interchange box comprising a first input port, a second input port, a first output port, a second output port and means for selectively coupling one of the input ports to at least one of the output ports.

3. The routing system of claim 2 wherein the bypass means comprises a plurality of bypass paths comprising a first set of bypass paths and a second set of bypass paths.

4. The routing system of claim 3 wherein each bypass path of the second set is paired with a bypass path of the first set to bypass each network interchange box of extra stage n and stage 0, and further comprising means for enabling selected bypass paths and means for disabling selected bypass paths.

5. The routing system as recited in claim 3 wherein each bypass path of the first set of bypass paths comprises a demultiplexer, each demultiplexer including a demultiplexer input, a first demultiplexer output coupled to the first input port of each network interchange box and a second demultiplexer output, and a multiplexer, each multiplexer including a first multiplexer input coupled to the first output port of each network interchange box, a second multiplexer input coupled to the second demultiplexer output and a multiplexer output, each bypass path of the second set of bypass paths comprising a demultiplexer, each demultiplexer including a demultiplexer input, a first demultiplexer output coupled to the second input port of each network interchange box and a second demultiplexer output, and a multiplexer, each multiplexer including a first multiplexer input coupled to the second output port of each network interchange box, and a second multiplexer input coupled to the second demultiplexer output and a multiplexer output.

6. The routing system of claim 5 and further comprising enabling means comprising first means for simultaneously activating all demultiplexers and multiplexers of extra stage n and second means for simultaneously activating all demultiplexers and multiplexers of stage 0.

7. A multistage data routing system for routing a plurality of data streams comprising a cube comprising a plurality of stages sequentially numbered $n-1$ through 0, an extra stage n situated to precede stage $n-1$ of the cube, stages n through 0 comprising a plurality of data switching boxes, each box comprising a first input port, a second input port, a first output port, a second output port, means for selectively coupling the first input port to at least one of the output ports and the second input port to at least one of the output ports, extra stage n and stage 0 including means for selectively bypassing stage n or stage 0 or neither stage n nor stage 0, a plurality of links, each link coupling a selected output port of a selected stage to a selected input port of the next adjacent downstream stage, a system control unit comprising means for coupling a selected input port of a data switching box of stage n to at least one of the output ports of the data switching boxes of stage 0 and means for selectively simultaneously disabling the selective bypassing means of at least one of stage n and stage 0.

8. A multistage data routing system comprising a plurality of stages sequentially numbered $n-1$ through 0, an extra stage n situated to precede stage $n-1$, extra stage n and stage 0 including means for selectively bypassing stage n or stage 0 or neither stage n nor stage 0 stages n and 0 both implementing one of the cube functions and stages $n-1$ through 1 implementing the remaining cube functions.

9. The routing system as recited in claim 8 wherein each of stages n through 0 comprises a plurality of network interchange boxes, each network interchange box comprising a first input port, a second input port, a first output port, a second output port and means for selectively coupling one of the input ports to at least one of the output ports.

10. The routing system of claim 9 wherein the bypass means comprises a plurality of bypass paths comprising a first set of bypass paths and a second set of bypass paths.

11. The routing system of claim 10 wherein each bypass path of the second set is paired with a bypass path of the first set to bypass each network interchange box of extra stage n and stage 0 and further comprising means for enabling selected bypass paths, and means for disabling selected bypass paths.

12. The routing system as recited in claim 10 wherein each bypass path of the first set of bypass paths comprises a demultiplexer, each demultiplexer including a demultiplexer input, a first demultiplexer output coupled to the first input port of each network interchange box and a second demultiplexer output, and a multiplexer, each multiplexer including a first multiplexer input coupled to the first output port of each network interchange box, a second multiplexer input coupled to the second demultiplexer output and a multiplexer output, each bypass path of the second set of bypass paths comprising a demultiplexer, each demultiplexer including a demultiplexer input, a first demultiplexer output coupled to the second input port of each network interchange box and a second demultiplexer output, and a multiplexer, each mulitplexer including a first multiplexer input coupled to the second output port of each network interchange box, and a second multiplexer input coupled to the second demultiplexer output, and a multiplexer output.

13. The routing system of claim 12 and further comprising enabling means comprising first means for simultaneously activating all demultiplexers and multiplexers of extra stage n and second means for simultaneously activating all demultiplexers and multiplexers of stage 0.

14. A multistage data routing system for routing a plurality of data streams comprising a plurality of stages sequentially numbered $n-1$ through 0, an extra stage n situated to precede stage $n-1$, stages n through 0 comprising a plurality of data switching boxes, each box comprising a first input port, a second input port, a first output port, a second output port, means for selectively coupling the first input port to at least one of the output ports and the second input port to at least one of the output ports, extra stage n and stage 0 including means for selectively bypassing stage n, or stage 0, or neither stage n nor stage 0, a plurality of links, each link coupling a selected output port of a selected stage to a selected input port of the next adjacent downstream stage, a system control unit comprising means for coupling a selected input port of a data switching box of stage n to at least one of the output ports of the data switching boxes of stage 0 and means for selectively simultaneously disabling the selective bypassing means of at least one of stage n and stage 0.

* * * * *

UNITED STATES PATENT AND TRADEMARK OFFICE
CERTIFICATE OF CORRECTION

PATENT NO. : 4,523,273
DATED : June 11, 1985
INVENTOR(S) : George B. Adams, III et al It is certified that error appears in the above-identified patent and that said Letters Patent is hereby corrected as shown below:

At column 10, line 44, delete "With" and insert therefor --When--; and

At column 12, line 57, delete "0≲j≲n" and insert therefor --0≼j≲n--.

Signed and Sealed this

Twenty-second Day of October 1985

[SEAL]

Attest:

DONALD J. QUIGG

Attesting Officer

Commissioner of Patents and
Trademarks—Designate